United States Patent [19]
Himmele et al.

[11] 3,919,324
[45] Nov. 11, 1975

[54] ALKAN-1-AL-7-OLS
[75] Inventors: Walter Himmele, Walldorf; Werner Hoffmann, Ludwigshafen; Heinrich Pasedach, Ludwigshafen; Werner Aquila, Ludwigshafen, all of Germany
[73] Assignee: Badische Anilin- & Soda-Fabrik Aktiengesellschaft, Ludwigshafen (Rhine), Germany
[22] Filed: Dec. 17, 1970
[21] Appl. No.: 99,308

[30] Foreign Application Priority Data
Dec. 24, 1969 Germany ..................962.8

[52] U.S. Cl. .................. 260/602; 252/522
[51] Int. Cl.$^2$ ........................ C07C 47/19
[58] Field of Search ........................ 260/602

[56] References Cited
UNITED STATES PATENTS
| | | |
|---|---|---|
| 3,239,566 | 3/1966 | Slaugh et al. .............. 260/610 B X |
| 3,463,818 | 8/1969 | Blumenthal .................. 260/602 X |
| 3,519,681 | 7/1970 | Saucy ........................ 260/602 X |

FOREIGN PATENTS OR APPLICATIONS
927,946   5/1955   Germany

*Primary Examiner*—Richard J. Gallagher
*Assistant Examiner*—D. B. Springer
*Attorney, Agent, or Firm*—Johnston, Keil, Thompson & Shurtleff

[57] ABSTRACT

Alkyl substituted alkan-1-al-7-ols and their production by reaction of alk-1-en-6-ols in the presence of rhodium and iridium catalysts with carbon monoxide and hydrogen at from 50°C to 200°C and 100 to 1,500 atmospheres.

4 Claims, No Drawings

ALKAN-1-AL-7-OLS

The present invention relates to a new process for the production of alkan-1-al-7-ols having the formula (I):

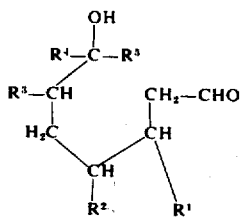

(I)

in which $R^1$ and $R^4$ each denotes methyl or ethyl, $R^2$ and $R^3$ each denotes hydrogen or methyl, and $R^5$ denotes hydrogen or alkyl having one to six carbon atoms.

It is known that the important perfume 3,7-dimethyloctan-1-al-7-ol (hydroxycitronellal) can be prepared in a two-stage synthesis from the natural substance citronellal or in a multistage process starting from 2-dehydrolinalool. These methods or preparation are however unsatisfactory in many respects, such as the necessity of starting from expensive natural substances, the expensive and cumbersome nature of the processes involving a large number of stages, or the impossibility of applying them to the production of homologous compounds.

The invention therefore has as its object to make hydroxycitronellal more readily availably and to make its homologs accessible for the first time.

We have found that alkan-1-al-7-ols having the general formula (I) are obtained in a notable reaction by reacting an alk-1-en-6-ol having the general formula (II):

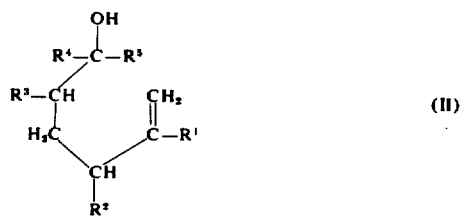

(II)

in the presence of a rhodium or iridium catalyst at from 50° to 200°C and 100 to 1,500 atmospheres with carbon monoxide and hydrogen.

The starting compounds (II) may be obtained in the following manner: (see U.S. application Ser. No. 99,307). When $R^5$ is hydrogen, they are obtained by reduction of 2-methylhep-1-en-6-one or appropriate derivatives thereof, and when $R^5$ is alkyl as defined they are obtained similarly in a known manner by reaction of this methylheptenone with an organometallic compound, for example a Grignard compound. The following are examples of starting compounds (II): 2-methylhept-1-en-6-ol, 2-ethylhept-1-en-6-ol, 2,3-dimethylhept-1-en-6-ol, 2,6-dimethylhept-1-en-6-ol, 2,3,6-trimethylhept-1-en-6-ol, 2,5,6-trimethylhept-1-en-6-ol, 2-ethyl-3-methylhept-1-en-6-ol, 2-ethyl-5-methylhept-1-en-6-ol, 2,6-dimethyloct-1-en-6-ol, 2,3,6-trimethyloct-1-en-6-ol, 2,5,6-trimethyloct-1-en-6-ol, 2-methyl-6-ethyloct-1-en-6-ol, 2,3-dimethyl-6-ethyloct-1-en-6-ol, 2,5-dimethyl-6-ethyloct-1-en-6-ol, 2-ethyl-6-methyloct-1-en-6-ol, 2-ethyl-3,6-dimethyloct-1-en-6-ol, 2-ethyl-5,6-dimethyloct-1-en-6-ol, 2,6-diethyloct-1-en-6-ol, 2,6-diethyl-3-methyloct-1-en-6-ol, 2,6-diethyl-5-methyloct-1-en-6-ol, 2,6,7-trimethyloct-1-en-6-ol, and the corresponding derivatives of non-1-en-6-ol, deca-1-en-6-ol, undeca-1-en-6-ol and dodeca-1-en-6-ol. Starting compounds having the formula (II) in which $R^1$ and $R^4$ denote methyl and $R^3$ denotes hydrogen such as 2-methylhept-1-en-6-ol, 2,3-dimethylhept-1-en-6-ol, 2,6-dimethylhept-1-en-6-ol, 2,3,6-trimethylhept-1-en-6-ol and the corresponding derivatives of oct-1-en-6-ol and 2,6,7-trimethyloct-1-en-6-ol have proved to be particularly useful.

The reaction according to the invention resembles in procedure the known hydroformylation or oxo synthetis (hereby incorporated by reference: J. Falbe: "Synthesen mit Kohlenmonoxid," Springer-Verlag, 1967, pp. 3 to 72). In spite of the same measures, the present method is a very remarkable variant having regard to the result of the reaction. Contrary to expectation supported by many literature references, the formyl group enters almost exclusively into the 1-position of the 1-olefin (II) and not into the 2-position.

Finely divided (particularly powdered) metallic rhodium, rhodium carbonyls, rhodium chloride, rhodium nitrate, rhodium sulfate, dirhodium tetracarbonyl dichloride and the complex compounds which are obtained by reaction of rhodium salts or rhodium carbonyl compounds with triphenyl phosphine, olefins or diolefins are suitable as catalysts for the hydroformylation reaction. Corresponding iridium catalysts may be used instead of the rhodium catalysts. The amount of catalyst may be 0.00001 to 1 percent, preferably from 0.0001 to 0.01 percent, by weight of rhodium or iridium based on the starting compound (II). Smaller amounts retard the reaction too much and larger amounts do not accelerate the reaction very much.

Carbon monoxide and hydrogen are preferably used in about equimolar amounts, but it is possible to use an excess of up to about four times the molar amount of either of the gases.

The hydroformylation is preferably carried out at from 80° to 150°C and a total pressure of 300 to 1,000 atmospheres of carbon monoxide and hydrogen in an inert solvent or diluent such as benzene, toluene, mixtures of xylenes, naphtha, ethers or esters.

The reaction mixture may be worked up into the product (I) by known methods, for example by fractional distillation at subatmospheric pressure.

The alkan-1-al-7-ols obtainable according to the invention are valuable odorants and, by reason of this property, have a wide variety of applications in perfumery and cosmetics and in improving the odor of industrial products such as detergents, glues, polymer dispersions and the like.

The following Examples illustrate the invention.

EXAMPLE 1

3,7-dimethyloctan-1-al-7-ol (hydroxycitronellal):

A solution of 1083 g of 2,6-dimethylhept-1-en-6-ol, 1083 g of benzene and 120 mg of the rhodium compound (cycloocta-1,4-diene-RhCl)$_2$ is heated for five hours at 100°C at a pressure of 700 atmospheres of an equimolar mixture of carbon monoxide and hydrogen and the reaction mixture is worked up by fractional distillation at subatmospheric pressure. The pure product of the process is obtained in a yield of 90 percent. Boiling point: 85°C at 0.03 mm; $n_D^{25} = 1.4462$.

EXAMPLES 2 to 5

By the method described in Example 1, the following are obtained:

EXAMPLE 2

3,4,7-trimethyloctan-1-al-7-ol from 2,3,6-trimethylhept-1-en-6-ol in a 70% yield; boiling point: 92° to 96°C at 0.7 mm; $n_D^{25} = 1.4511$; odor: cyclamen with a note resembling menthol.

EXAMPLE 3

3,7-dimethylnonan-1-al-7-ol from 2,6-dimethyloct-1-en-6-ol in a yield of 85 percent; boiling point: 89° to 91°C at 0.7 mm; $n_D^{25} = 1.4513$; odor: fresh fruity smell reminiscent of oranges and mandarins.

EXAMPLE 4

3,7,8-trimethylnonan-1-al-7-ol from 2,6,7-trimethyloct-1-en-6-ol in a yield of 55 percent; boiling point 94°C at 0.45 mm; $n_D^{25} = 1.4564$; odor: fruity note reminiscent of apricots.

EXAMPLE 5

3-methyloctan-1-al-7-ol from 2-methylhept-1-en-6-ol in a yield of 73 percent; boiling point 78° to 81°C at 0.01 mm; $n_D^{25} = 1.4506$; odor: resembling hydroxycitronellal with a fresh note.

EXAMPLE 6

3,7-dimethyloctan-1-al-7-ol:

A solution of 250 g of 2,6-dimethylhept-1-en-6-ol, 250 ml of cyclohexane, 200 mg of the rhodium compound $(P(C_6H_5)_3)Rh(CO)Cl$ and 6 g of triphenyl phosphine is heated for five hours at 100°C under a pressure of 700 atmospheres of an equimolar mixture of carbon monoxide and hydrogen and then worked up by distillation. The pure product is obtained in a yield of 85 percent.

We claim:
1. 3,4,7-trimethyloctan-1-al-7-ol.
2. 3,7-dimethylnonan-1-al-7-ol.
3. 3,7,8-trimethylnonan-1-al-7-ol.
4. 3-methyloctan-1-al-7-ol.

* * * * *